United States Patent [19]

Moss et al.

[11] Patent Number: 4,755,321
[45] Date of Patent: Jul. 5, 1988

[54] STORAGE STABLE POLYOL COMPOSITIONS

[75] Inventors: Christopher T. Moss, Columbus; Gary E. Kimes, Hilliard; Timothy A. Tufts, Powell, all of Ohio

[73] Assignee: Ashland Oil, Inc., Russell, Ky.

[21] Appl. No.: 52,935

[22] Filed: May 22, 1987

[51] Int. Cl.$^4$ .................. C09K 3/00; H05B 33/00; C08G 18/08; C08G 18/22

[52] U.S. Cl. ................ 252/182.24; 528/55; 528/56; 528/57; 252/182.25

[58] Field of Search ............ 252/182; 528/55, 56, 528/57

[56] References Cited

U.S. PATENT DOCUMENTS 3,993,576 11/1976 Barron .................... 252/182
4,029,593 6/1977 Schäpel et al. .................... 252/182
4,065,410 12/1977 Schäfer et al. .................... 252/182
4,352,896 10/1982 Kopp et al. .................... 252/182
4,576,731 3/1986 Rieck .................... 252/182
4,579,877 4/1986 Goel et al. .................... 252/182

*Primary Examiner*—Harold D. Anderson
*Assistant Examiner*—Dennis R. Daley
*Attorney, Agent, or Firm*—H. M. Hanegan; M. E. Picken; D. L. Hedden

[57] ABSTRACT

Disclosed is a storage stable blend of a long chain polyol and a short chain glycol wherein the glycol is present in an amount whereby the glycol and polyol form an incompatible blend. The blend is rendered storage stable by the addition of a compatibilizing amount of a salt wherein the salt is formed from a metal having a charge density of from about 1.25 to about 1.45.

19 Claims, No Drawings

STORAGE STABLE POLYOL COMPOSITIONS

BACKGROUND OF THE INVENTION

The present invention relates to polyol blends such as are used in preparation of molded parts and more particularly to the stabilization of such polyol blends and to improved thermoset molded parts made therefrom.

Reaction Injection Moldings (RIM) are urethanes basically consisting of a polyol and a polyisocyanate, usually with an extender (e.g. a glycol or a diamine), optionally with a blowing agent (e.g. air), optional reinforcing material (e.g. glass, mica, etc.), wetting agents, and the like, which materials are high pressure injected through a mixing head into a pre-heated mold with usual post-molding baking thereafter applied. RIM urethanes can range from low modulus to very high modulus material parts, foamed on the interior but with a smooth surface. RIM urethanes are capable of being made into very large one-piece parts which are very light in weight. Typical present-day uses of RIM parts include, for example, automobile parts (e.g. bumpers, air deflectors, fenders, front ends, etc.), business machine housings, ski boots, office furniture, and a wide variety of products.

When a glycol extender is utilized in conjunction with a long chain polyol, such as a long chain polyoxyalkylene polyol, it has been reported that the blend suffers from storage stability by separating into two phases. Such phase separation creates difficulties at the plant since mixing of the phase-separated blend must precede use of the blend whether such blend is utilized in RIM part formation or is utilized for other purposes. A variety of proposals aimed at rendering the mixture of long chain polyol and short chain diol compatible have appeared in the art. For example, U.S. Pat. No. 3,929,730 proposes to compatibilize the blend of a polyol and 1,4-butanediol by the addition of thiodiglycol or phenylenediethanolamine. U.S. Pat. No. 3,993,576 proposes to compatibilize mixtures of high molecular weight polyols and low molecular weight polyols by the addition of a butylene glycol or propylene glycol such as dibutylene glycol. U.S. Pat. No. 4,220,732 proposes to compatibilize the blend of polyol and glycol by utilizing as the glycol extender a combination of 1,4-butanediol and phenyldiethanolamine. U.S. Pat. No. 4,385,133 compatibilizes the polyol/glycol blend by employing as the polyol component a mixture of specific polyoxypropylene polyoxyethylene polyols of specific molecular weight and functionality. Other proposals involve the use of salts (potassium chloride or potassium acetate) or add a small amount of isocyanate for partial reaction and compatibilization of the blend. U.S. Pat. No. 4,581,470 teaches the use of nitrogen containing polyols as compatibilizing agents. U.S. Pat. No. 4,575,518 discloses the use of a wide variety of salts as compatibility agents for glycol/polyol blends. U.S. Pat. No. 4,576,731 teaches pre-reacting a portion of the isocyanate with the incompatible mixtures. Chain extenders prepared from proplyene oxide capped ethylene glycol have been shown to give one-phase mixtures (U.S. Pat. No. 4,518,521), as well as mixtures of 1,4-butanediol and phenylenediethanolamine (U.S. Pat. No. 3,929,730), or various butylene glycols (U.S. Pat. No. 3,995,576). U.S. Pat. No. 4,485,032 disclosed the use of substituted ureas as compatibilization agents. These prior art compatibilizing agents suffer from several deficiencies, primarily low extender levels allowed, high viscosity of resulting mixtures and limited applicability.

Despite such advances in the art, need for effectively stabilizing the polyol/glycol blend while improving the final urethane product still is a desire of the art.

BROAD STATEMENT OF THE INVENTION

The present invention is addressed to compatibilizing an incompatible blend of a long chain polyol and short chain glycol. Such method comprises incorporating into the blend a compatibilizing amount of certain salts.

Another aspect of the present invention is the resulting blend of long chain polyol, short chain glycol, and compatibilizing salt. Other aspects of the present invention will readily appear to those skilled in the art based upon the disclosure contained herein.

Advantages of the present invention include the ability to effectively and efficiently compatibilize a blend of polyol and glycol for making a practical storage stable product. Yet another advantage is the increased compatibility of salt modified polyol blend and isocyanate which is achieved. A further advantage is the ability to make tough and rigid thermosets via the simultaneous polymerization of hydroxy/isocyanate functionality and trimerization of the isocyanate functionality. These and other advantages of the present invention will be readily apparent from the description which follows.

DETAILED DESCRIPTION OF THE INVENTION

The three prime ingredients of the compatibilized blend are a long chain polyol, a short chain glycol, and a compatibilizing salt. Referring initially to the salt, it has been found that salts useful in the practice of the present invention include those where the cation of the salt is formed from a metal which has a charge density (the charge per unit area on a surface or per unit volume in space, the ionic radii in Å/unit charge) from about 1.25 to about 1.45. Metals which have the required charge density include $K^+$ (1.33), $Tl^{+1}$ (1.4), $In^{+1}$ (1.32), $Au^{+1}$ (1.37), and $Ag^{+1}$ (1.26). The anion may be any that allows relatively easy solubility in the glycol/polyol mixture.

The proportion of compatibilizing salt is an amount effective for making the blend of long chain polyol and short chain glycol storage stable or phase-stable. Such effective amount typically translates into a percentage of salt ranging from about 0.2 to 5.0 and advantageously between about 0.4 and 2.0. Of course, mixtures of the salts may be utilized as is necessary, desirable, or convenient.

The foregoing description illustrates the presently preferred embodiment of the present invention wherein a long chain polyol and short chain glycol incompatible mixture is compatibilized by a salt. It should be realized that addition of additional long chain polyols to such three-component mixture usually will affect the amount of salt required for compatibilizing the incompatible blend. Thus, the weight ratio noted above is illustrative only and may be required to be adjusted to a significant degree on occasion.

Referring to the incompatible blend of long chain polyol and short chain glycol, RIM technology requires levels of short chain glycol to be such that the solubility level of the short chain glycol in the long chain polyol is exceeded; thus the lack of storage or phase stability. The short chain glycols typically have greater than 50% by weight of a propylene glycol/dipropylene glycol blend. Advantageously the ratio of propylene glycol to dipropylene glycol ranges from about 5 to 1 to about 1 to 2. Other chain extender glycols which may be used, preferably as a minor component, include ethylene glycols, 1,4-butanediol, and the like. It has been found that extremely high levels of short chain glycols, not possible with prior art compatibilizers, can form compatible mixtures with the salts of the present invention and long chain polyols. The level of short chain glycol typically will be from about 50 to about 80 percent by weight of the long chain polyol when the resulting blend is intended for use in RIM technology.

Referring to the long chain polyols, such polyols typically are di- or tri-functional hydroxyl terminated polyalkylene oxides prepared from ethylene oxide, propylene oxide, and the like, along with combinations of alkylene oxides such as ethylene oxide/propylene oxide and the like blends. Molecular weight ranges for the long chain polyols advantageously are from about 1,000g/mole to about 20,000 g/mole, preferably from about 2,000 g/mole to about 10,000 g/mole. Additional examples of long chain polyols can be found in U.S. Pat. Nos. 4,385,133, 3,929,730, 3,993,576, and 4,227,032.

The compatibilized blend is storage or phase stable which means that the compatibilized blend exhibits single phase characteristics when stored at, for example, room temperature, for a time period of at least three months though typically storage of up to six months may be required. Additionally, the compatibilized blend exhibits thermal stability by exhibiting no significant increase in viscosity when subjected to storage at elevated temperature of, for example, about 100° C. Additionally the compatibilized blend can be subjected to multiple freeze-thaw cycles and still exhibit single phase characteristics wherein no significant increase of viscosity can be detected. The ability to exhibit single phase characteristics with no significant increase in viscosity renders the compatibilized blend "storage stable" for present purposes.

The viscosities of the mixtures of the present invention are unexpectedly lower than those of the prior art and are well suited for RIM processing. The Examples of the present invention (Examples 18-33) have viscosities from 200 cps to about 1000 cps whereas the prior art viscosities were as high as 66,000 cps (Example 16).

Any of the organic polyisocyanates commonly employed in the art of preparing polyurethanes can be employed in forming urethane parts from the compatibilized blend of the present invention. Such polyisocyanates often are polymeric isocyanates in order to reduce toxic vapors of isocyanate monomers. Further, alcohol-modified and other modified isocyanate compositions (e.g. thiocyanates) may be used. Polyisocyanates preferably will have from about 2-4 isocyanate groups per molecule in forming urethane parts. Suitable polyisocyanates for use in the present invention include, for example, hexamethylene diisocyanate, 4,4'-toluene diisocyanate (TDI), diphenylmethane diisocyanate (MDI), polymethyl polyphenyl isocyanate (Polymeric MDI or PAPI), m- and p-phenylene diisocyanates, bitolylene diisocyanate, triphenylmethane triisocyanate, tris-(4-isocyanatophenyl) thiophosphate, cyclohexane diisocyanate (CHDI), bis-(isocyanatomethyl) cyclohexane ($H_6$ X DI), dicyclohexylmethane diisocyanate ($H_{12}$MDI), trimethylhexane diisocyanate, dimer acid diisocyanate (DDI), dicylcohexylmethane diisocyanate, and dimethyl derivatives thereof, trimethyl hexamethylene diisocyanate, lysine diisocyanate and its methyl ester, isophorone diisocyanate, methyl cyclohexane diisocyanate, 1,5-napthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and the like and mixtures thereof. Aromatic and aliphatic polyisocyanate dimers, trimers, oligomers, polymers (including biuret and isocyanurate derivatives), and isocyanate functional prepolymers often are available as preformed packages and such packages are suitable for use in the present invention also.

The proportion of isocyanate groups to hydroxyl groups in the urethane-forming composition (isocyanate index) typically will range from about 0.8:1 to about 1.2:1, though such ratio can vary as is well known in this art. The two packages or streams which are utilized in forming RIM parts comprise the compatibilized blend as one stream and the polyisocyanate as the second stream. Each stream may contain appropriate catalytic amounts of catalysts which promote the reaction between hydroxyl groups and isocyanate groups. Urethane-promoting catalysts are well known in the art and include a wide variety of organic and inorganic salts of, and organometallic derivatives of, bismuth, lead, tin, and the like, as well as phosphine and tertiary organic amines. The art cited above contains exemplary lists of such catalysts and should be referred to for a further description thereof.

Other commonly used additives for RIM products can be applied to the present invention provided that they are inert to the stability and reactivity of the composition. Such additives include, for example, fillers, blowing agents, reinforcing agents, dyes, pigments, moisture scavengers, diluents, surfactants, mold release agents, and the like.

The following examples show how the present invention has been practiced, but should not be construed as limiting. In this application, all units are in the metric system, and all percentages and proportions are by weight, unless otherwise expressly indicated. Also, all citations set forth herein are expressly incorporated here by reference.

EXAMPLES 1-33

Incompatible mixture of long chain polyols and short chain glycols were prepared using the compatabilizers of the present invention compared with known compatabilizers. The formulations and test results are set forth below. The indicated amounts of the various components were mixed and heated if necessary, allowed to cool to room temperature and observed. Miscibility was indicated when a clear, homogeneous solution was attained with no phase separation after setting for seven days.

TABLE 1 (A)

| Composition* | EXAMPLE NO. | | | | |
|---|---|---|---|---|---|
| | 1 | 2 | 3 | 4 | 5 |
| Incompatible Mixture | | | | | |
| Propylene Glycol | 33 | 33 | 33 | 33 | 33 |
| Dipropylene Glycol | 33 | 33 | 33 | 33 | 33 |
| Polyol C | 33 | | 33 | 33 | 33 |
| Polyol D | | 33 | | | |
| Compatabilizer | | | | | |
| Zinc octoate | 4 | 4 | | | |
| Lead octoate | | | 4 | | |

TABLE 1 (A)-continued

|  |  |  |  |  |  |
|---|---|---|---|---|---|
| Molybdenum octoate |  |  |  | 4 |  |
| Cobalt octoate |  |  |  |  | 4 |
| Miscibility | No | No | No | No | No |

Polyol A: Thanol SF-5505 (Texaco), a polyether triol based on ethylene oxide/propylene oxide, molecular weight 5,000.
Polyol B: Voranol 2148 (Dow), a 7,200 molecular weight ethylene oxide/propylene oxide based polyether triol.
Polyol C: Multranol 3901 (Mobay), a polyether triol based on ethylene oxide/propylene oxide, molecular weight 6,000 g/mole.
Polyol D: TPE 4542 (BASF), a 4500 MW polyether triol.
Polyol E: TP 4040 (BASF), a 4000 MW polyether triol.
Polyol F: Pluracol 380 (BASF), a 6200 MW polyether triol.
T-45: (Dabco), a 50% by weight solution of potassium octoate in dipropylene glycol

TABLE 1 (B)

| | EXAMPLE NO. | | | | | |
|---|---|---|---|---|---|---|
| Composition | 6 | 7 | 8 | 9 | 10 | 11 |
| Incompatible Mixture | | | | | | |
| Propylene Glycol | 33 | 33 | 33 | 33 | 33 | 33 |
| Dipropylene Glycol | 33 | 33 | 33 | 33 | 33 | 33 |
| Polyol C | 33 | 33 | 33 | 33 | 33 | 33 |
| Compatabilizer | | | | | | |
| Cobalt naphthalate | 4 | | | | | |
| Nickel octoate | | 4 | | | | |
| Sodium acetate | | | 1 | | | |
| Sodium hydroxide | | | | 1 | | |
| Lithium acetate | | | | | 1 | |
| Lithium hydroxide | | | | | | 1 |
| Miscibility | No | No | No | No | No | No |

TABLE 1 (C)

| | EXAMPLE NO. | | | |
|---|---|---|---|---|
| Composition | 12 | 13 | 14 | 15 |
| Incompatible Mixture | | | | |
| Ethylene Glycol | | | 50 | |
| Propylene Glycol | 33 | 33 | | 15 |
| Dipropylene Glycol | 33 | 33 | | |
| Polyol C | 33 | 33 | | |
| Polyol F | | | 50 | |
| Polyol B | | | | 85 |
| Compatabilizer | | | | |
| Calcium octoate | 1 | | | |
| Bismuth octoate | | 1 | | |
| Potassium acetate | | | 1 | 0.7 |
| Miscibility | No | No | No | No |

TABLE 1 (D)

| | EXAMPLE NO. | | | | | |
|---|---|---|---|---|---|---|
| Composition | 16 | 17 | 18 | 19 | 20 | 21 |
| Incompatible Mixture | | | | | | |
| Ethylene Glycol | 30 | | | | | |
| Propylene Glycol | | 33 | 40 | 43 | 40 | 43 |
| Dipropylene Glycol | | 33 | 20 | 17 | 20 | 17 |
| Polyol B | 70 | | | | 40 | 43 |
| Polyol A | | 33 | 40 | 43 | | |
| Compatabilizer | | | | | | |
| Potassium acetate | 1 | | | | | |
| Benzyltrimethyl ammonium chloride | | 1 | | | | |
| T-45 | | | 0.5 | 0.5 | 0.5 | 0.3 |
| Miscibility | No | No | Yes | Yes | Yes | Yes |

TABLE 1 (E)

| | EXAMPLE NO. | | | |
|---|---|---|---|---|
| Composition | 22 | 23 | 24 | 25 |
| Incompatible Mixture | | | | |
| Propylene Glycol | 33 | 50 | 50 | 40 |
| Dipropylene Glycol | 33 | 25 | 25 | 20 |
| Polyol C | 33 | 25 | 25 | 40 |
| Compatabilizer | | | | |
| T-45 | 0.2 | 0.1 | 0.4 | 0.4 |
| Miscibility | Yes | No | Yes | Yes |

TABLE 1 (F)

| | EXAMPLE NO. | | | | |
|---|---|---|---|---|---|
| Composition | 26 | 27 | 28 | 29 | 30 |
| Incompatible Mixture | | | | | |
| 1,4-Butanediol | | 24 | | | |
| Ethylene Glycol | 20 | | | | |
| Propylene Glycol | 20 | 33 | 33 | 33 | 20 |
| Dipropylene Glycol | 30 | 10 | 33 | 33 | 40 |
| Polyol C | 30 | 33 | 33 | | |
| Polyol D | | | | 33 | |
| Polyol E | | | | | 40 |
| Compatabilizer | | | | | |
| Potassium acetate | 1 | 1 | | | |
| Potassium hydroxide | | | 0.2 | 0.8 | 1.5 |
| Miscibility | Yes | Yes | Yes | Yes | Yes |

TABLE 1 (G)

| | EXAMPLE NO. | | |
|---|---|---|---|
| Composition | 31 | 32 | 33 |
| Incompatible Mixture | | | |
| Propylene Glycol | 33 | 33 | 40 |
| Dipropylene Glycol | 33 | 33 | 20 |
| Polyol D | 33 | 33 | |
| Polyol F | | | 40 |
| Compatabilizer | | | |
| Thallium acetate | 1 | | |
| Silver nitrate | | 1 | |
| T-45 | | | 1 |
| Miscibility | Yes | Yes | Yes |

What is claimed is:

1. A method for making a storage stable blend of a long chain polyol and a short chain glycol which blend phase separates under storage, which comprises:
   incorporating into said blend a compatibilizing amount of a salt wherein the salt is formed from a metal having a charge density of from about 1.25 to about 1.45.

2. The method of claim 1 wherein the salt is present in a weight percent of from about 0.2 to about 5.0.

3. The method of claim 2 wherein said weight percent ranges from between about 0.4 and about 2.0.

4. The method of claim 1 wherein said metal portion of the salt is selected from the group consisting of potassium, thallium, indium, gold, and silver.

5. The method of claim 4 wherein said salt is potassium octoate.

6. The method of claim 4 wherein said salt is potassium acetate.

7. The method of claim 4 wherein said salt is potassium hydroxide.

8. The method of claim 4 wherein said salt is thallium acetate.

9. The method of claim 4 wherein said salt is silver nitrate.

10. The method of claim 1 wherein the proportion of glycol in said blend ranges from between about 50 and about 80 percent and the proportion of polyol in said blend ranges from between about 50 and about 20 percent by weight.

11. The method of claim 1 wherein said polyol has a molecular weight ranging from between about 1,000 and 20,000.

12. The method of claim 1 wherein said glycol comprises a propylene glycol/dipropylene glycol blend.

13. The method of claim 12 wherein said glycol comprises greater than about 50 percent by weight of the propylene glycol/dipropylene glycol blend.

14. The method of claim 12 wherein the ratio of propylene glycol to dipropylene glycol is from about 5 to 1 to about 1 to 2.

15. A storage stable blend which comprises:
a long chain polyol, a short chain glycol, and an effective amount of a salt, wherein the salt is formed from a metal having a charge density of from about 1.25 to about 1.45, said glycol present in an amount whereby the glycol and polyol form an incompatible blend in the absence of said salt.

16. The blend of claim 15 wherein the salt is present in a weight percent of from about 0.2 and about 5.0.

17. The blend of claim 15 wherein the proportion of glycol in said blend ranges from between about 50 and about 80 percent by weight and the proportion of polyol in said blend ranges from between about 50 and about 20 precent by weight.

18. The blend of claim 15 wherein said polyol has a molecular weight of between about 1,000 and 20,000.

19. The blend of claim 15 wherein said glycol comprises a propylene glycol/dipropylene glycol blend.

* * * * *